US009014939B1

(12) United States Patent
Mendenhall et al.

(10) Patent No.: US 9,014,939 B1
(45) Date of Patent: Apr. 21, 2015

(54) SIGNAL BASED SAFETY SYSTEM FOR CONSTRUCTION ZONE

(71) Applicant: Robert L. Mendenhall, Las Vegas, NV (US)

(72) Inventors: Robert L. Mendenhall, Las Vegas, NV (US); Leonard Gainey, Las Vegas, NV (US); Gilbert Cabrera, Las Vegas, NV (US); John Bugay, Las Vegas, NV (US)

(73) Assignee: Robert L. Mendenhall, Las Vegas, NV (US)

( * ) Notice: Subject to any disclaimer, the term of this patent is extended or adjusted under 35 U.S.C. 154(b) by 0 days.

(21) Appl. No.: 13/868,905

(22) Filed: Apr. 23, 2013

Related U.S. Application Data

(63) Continuation-in-part of application No. 13/712,910, filed on Dec. 12, 2012.

(51) Int. Cl.
*B60R 21/34* (2011.01)
*G08G 1/16* (2006.01)

(52) U.S. Cl.
CPC ........................................ *G08G 1/16* (2013.01)

(58) Field of Classification Search
CPC ................ B60T 7/12; B60T 7/16; B60T 7/22
USPC ............ 701/50, 67, 70, 48, 301, 117; 342/61, 342/70, 71, 455; 180/169; 340/436, 568.1, 340/572.4, 573.4; 303/193; 188/151 A; 73/132
See application file for complete search history.

(56) References Cited

U.S. PATENT DOCUMENTS 2,804,160 A 8/1957 Rashid
3,635,317 A * 1/1972 Crabb et al. ............... 192/220.1

(Continued)

FOREIGN PATENT DOCUMENTS

EP 0850812 A1 1/1996

OTHER PUBLICATIONS

Perez, Joshue; Seco, Fernando; Milanes, Vincente; Jimenez, Antonio; Diaz, Julio C.; and De Pedro, Teresa, An RFID-Based intelligent Vehicle Speed Controller Using Active Traffic Signals, Sensors (Multidisciplinary Digital Publishing Institute—Basel), Jun. 9, 2010, vol. 10(6), obtained from http://www.ncbi.nlm.nih.gov/pmc/articles/PMC3247737, National Center for Biotechnology Information, U.S. National Library of Medicine.

(Continued)

*Primary Examiner* — Thomas G Black
*Assistant Examiner* — Sara Nelson
(74) *Attorney, Agent, or Firm* — Greenberg Traurig LLP

(57) ABSTRACT

A system incorporating one or more interrogators or readers on heavy construction equipment (e.g., loaders) detect signals emanating from signal transmitters on clothing or equipment of construction workers. Responsive to the detection of a signal emanating from behind the heavy equipment, or in another position relative to the heavy equipment, the driver is notified audibly of the danger such that the driver may stop the movement of the heavy equipment or causes the brakes to be applied and transmission to be disengaged automatically without operator involvement. In another version, a wet brake system (also known as a hydraulic brake system) is triggered automatically responsive to the detection of one or more signals emanating from behind a heavy piece of equipment, or in another position relative to the piece of heavy equipment. A hydraulic cylinder is configured to depresses a de-clutch brake pedal when personnel are identified in a danger zone.

8 Claims, 20 Drawing Sheets

(56) References Cited

U.S. PATENT DOCUMENTS

| | | | | |
|---|---|---|---|---|
| 3,683,379 | A | 8/1972 | Saddler et al. | |
| 3,729,074 | A * | 4/1973 | Anderson et al. | 192/220.1 |
| 3,877,299 | A * | 4/1975 | Clayton et al. | 73/132 |
| 3,882,957 | A | 5/1975 | Fritz | |
| 3,892,483 | A | 7/1975 | Saufferer | |
| 3,898,652 | A | 8/1975 | Rashid | |
| 3,976,151 | A | 8/1976 | Farque | |
| 4,079,802 | A | 3/1978 | Kawata | |
| 4,136,329 | A | 1/1979 | Trobert | |
| 4,273,224 | A * | 6/1981 | Brown et al. | 477/95 |
| 4,278,962 | A | 7/1981 | Lin | |
| 4,528,563 | A | 7/1985 | Takeuchi | |
| 4,530,427 | A * | 7/1985 | Skeel | 192/220.1 |
| 4,574,927 | A * | 3/1986 | Sturtz, Jr. | 192/219.6 |
| 4,722,416 | A * | 2/1988 | Ahnafield | 180/333 |
| 4,849,735 | A | 7/1989 | Kirtley et al. | |
| 5,533,795 | A * | 7/1996 | Brooks | 303/6.1 |
| 5,865,279 | A * | 2/1999 | Nommensen | 188/345 |
| 5,913,945 | A * | 6/1999 | Froelich et al. | 74/512 |
| 6,030,053 | A | 2/2000 | Jeon | |
| 6,276,136 | B1 * | 8/2001 | Oishi et al. | 60/547.1 |
| 6,279,937 | B1 * | 8/2001 | Hunt | 180/336 |
| 6,405,132 | B1 | 6/2002 | Breed et al. | |
| 6,559,774 | B2 | 5/2003 | Bergan et al. | |
| 6,606,027 | B1 | 8/2003 | Reeves et al. | |
| 6,848,753 | B2 | 2/2005 | Tanaka | |
| 6,892,595 | B2 * | 5/2005 | Inoue et al. | 74/336 B |
| 6,959,968 | B2 | 11/2005 | Bale et al. | |
| 7,213,687 | B2 | 5/2007 | Sakai et al. | |
| 7,229,139 | B2 | 6/2007 | Lu et al. | |
| 7,425,043 | B2 | 9/2008 | Doerr et al. | |
| 7,565,242 | B2 | 7/2009 | Lucas et al. | |
| 7,578,564 | B2 * | 8/2009 | Sakai | 303/119.3 |
| 7,786,864 | B1 | 8/2010 | Showstak et al. | |
| 7,793,764 | B2 * | 9/2010 | Fujimoto et al. | 188/71.4 |
| 7,880,620 | B2 | 2/2011 | Hatori et al. | |
| 8,145,368 | B2 | 3/2012 | Won et al. | |
| 8,157,071 | B2 * | 4/2012 | Mordukhovich | 192/52.6 |
| 8,169,311 | B1 | 5/2012 | Breed | |
| 8,175,796 | B1 | 5/2012 | Blackburn et al. | |
| 2005/0061572 | A1 * | 3/2005 | Misaki et al. | 180/315 |
| 2005/0162012 | A1 | 7/2005 | Sakai et al. | |
| 2005/0209763 | A1 | 9/2005 | Offerle et al. | |
| 2006/0116821 | A1 | 6/2006 | Kim et al. | |
| 2007/0290551 | A1 * | 12/2007 | Fujimoto et al. | 303/6.01 |
| 2008/0018472 | A1 * | 1/2008 | Dasilva et al. | 340/572.4 |
| 2009/0013685 | A1 * | 1/2009 | Molenaar | 60/585 |
| 2009/0043462 | A1 * | 2/2009 | Stratton et al. | 701/50 |
| 2009/0158790 | A1 * | 6/2009 | Oliver | 70/202 |
| 2009/0303035 | A1 | 12/2009 | Kirtley, Jr. | |
| 2010/0308644 | A1 * | 12/2010 | Ishikawa et al. | 303/10 |
| 2011/0174151 | A1 * | 7/2011 | Weiss et al. | 91/4 R |
| 2012/0167565 | A1 * | 7/2012 | Richard et al. | 60/545 |
| 2012/0203435 | A1 | 8/2012 | Braennstroem et al. | |
| 2012/0325602 | A1 * | 12/2012 | Williams | 188/170 |
| 2013/0238205 | A1 * | 9/2013 | Edwards et al. | 701/70 |

OTHER PUBLICATIONS

RFID Connect, Hong Kong RFID Ltd.: Construction Site Safety with RFID Alarm System, obtained from http://www.rfidconnect.com/PressReleaseDetails.aspx?id=1350bf03-7786-4836-a6bf-04e68925c7faid=1350bf03-7786-4836-a6bf-04e68925c7fa.

* cited by examiner

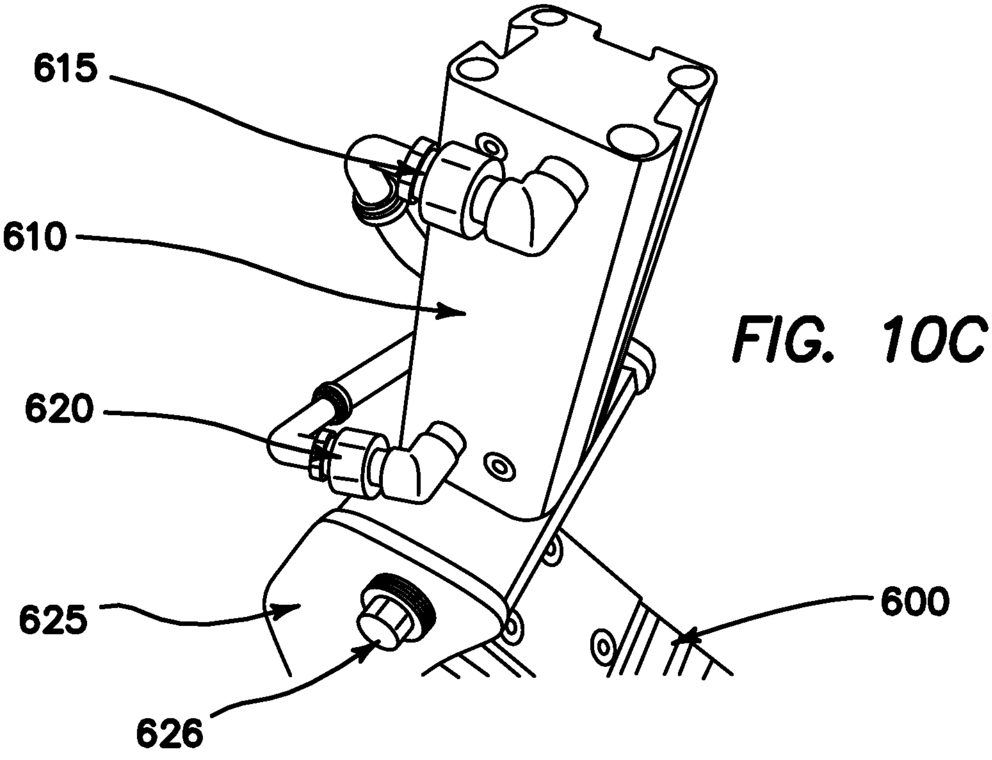
FIG. 10C
FIG. 10E
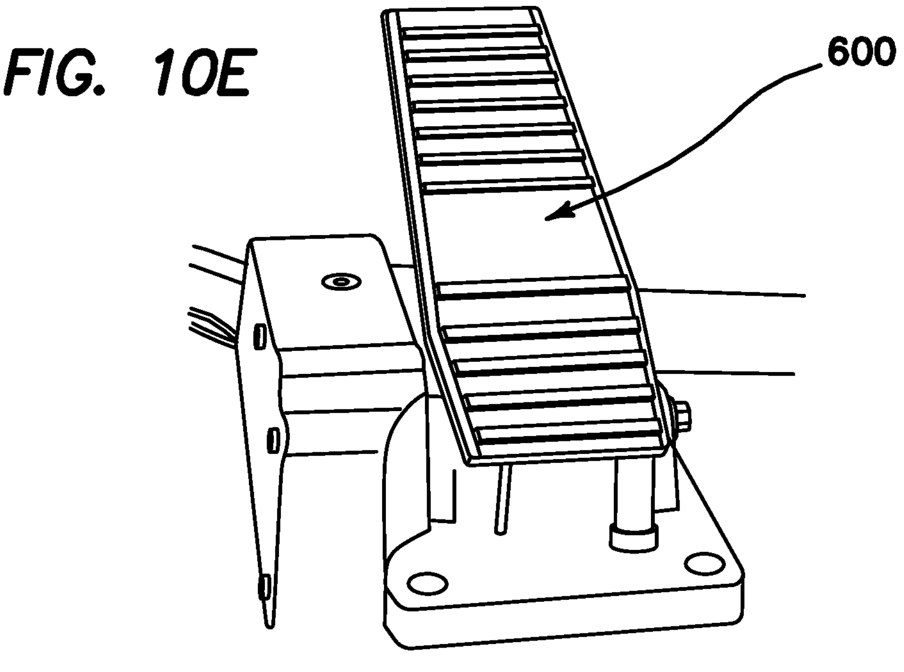

SIGNAL BASED SAFETY SYSTEM FOR CONSTRUCTION ZONE

CROSS-REFERENCE

This application is a continuation-in-part of U.S. patent application Ser. No. 13/712,910 Dec. 12, 2012 which is incorporated by reference herein for all purposes.

FIELD OF THE INVENTION

The embodiments of the present invention relate to a construction zone safety system using radio frequency identification ("RFID") devices or other signal-based devices.

BACKGROUND

Construction zone safety is critically important to all parties involved including, but not limited to, construction companies, construction workers, insurance companies, land developers and municipalities. The seriousness of construction zone safety is evidenced by the creation of the Occupational Safety and Health Administration ("OSHA") which is tasked with monitoring construction zones as well as other areas. In one respect, OSHA is concerned with injuries or death of construction workers.

It would be advantageous to develop a signal-based safety system to reduce or eliminate injuries and accidents at construction zones.

SUMMARY

The embodiments of the present invention involve the use of one or more readers on heavy construction equipment (e.g., loaders) which detect signals emanating from signal transmitters on clothing or equipment of construction workers. In one embodiment, responsive to the detection of one or more signals emanating from behind a heavy piece of equipment, or in another position relative to the piece of heavy equipment, a controller integrated on the piece of heavy equipment causes the parking/emergency brake to be applied and/or transmission to be disengaged automatically without operator involvement.

In one embodiment, one or more readers are attached to the rear of the piece of heavy equipment and detect signals from RFID devices attached to the clothing or equipment of construction workers in the construction zone. The readers are positioned to capture signals from behind and/or along sides of the piece of heavy equipment. Hardware installed on the piece of heavy equipment serves to apply the parking brake of the piece of heavy equipment and/or disengage the transmission responsive to a controller signal.

In another embodiment, a wet brake system (also known as a hydraulic brake system) is triggered automatically responsive to the detection of one or more signals emanating from behind a heavy piece of equipment, or in another position relative to the piece of heavy equipment. This embodiment works well with fully loaded equipment which requires additional distance to slow down and ultimately stop. For example, a fully loaded loader can be stopped in 12 feet when traveling at 10 mph in reverse.

In other embodiments, additional technology such as infrared sensors, acoustic sensors, thermal imaging sensors, cameras with human recognition software, radar, lidar and/or custom RF equipment (subject to FCC license and FCC Part 15) may be used to locate workers near the piece of heavy equipment namely a danger zone.

Other variations, embodiments and features of the present invention will become evident from the following detailed description, drawings and claims.

BRIEF DESCRIPTION OF THE DRAWINGS

FIGS. 10a-10e illustrate an automatically controlled de-clutch brake pedal adapted to control a wet brake system according to the embodiments of the present invention;

DETAILED DESCRIPTION

Figure 1A:
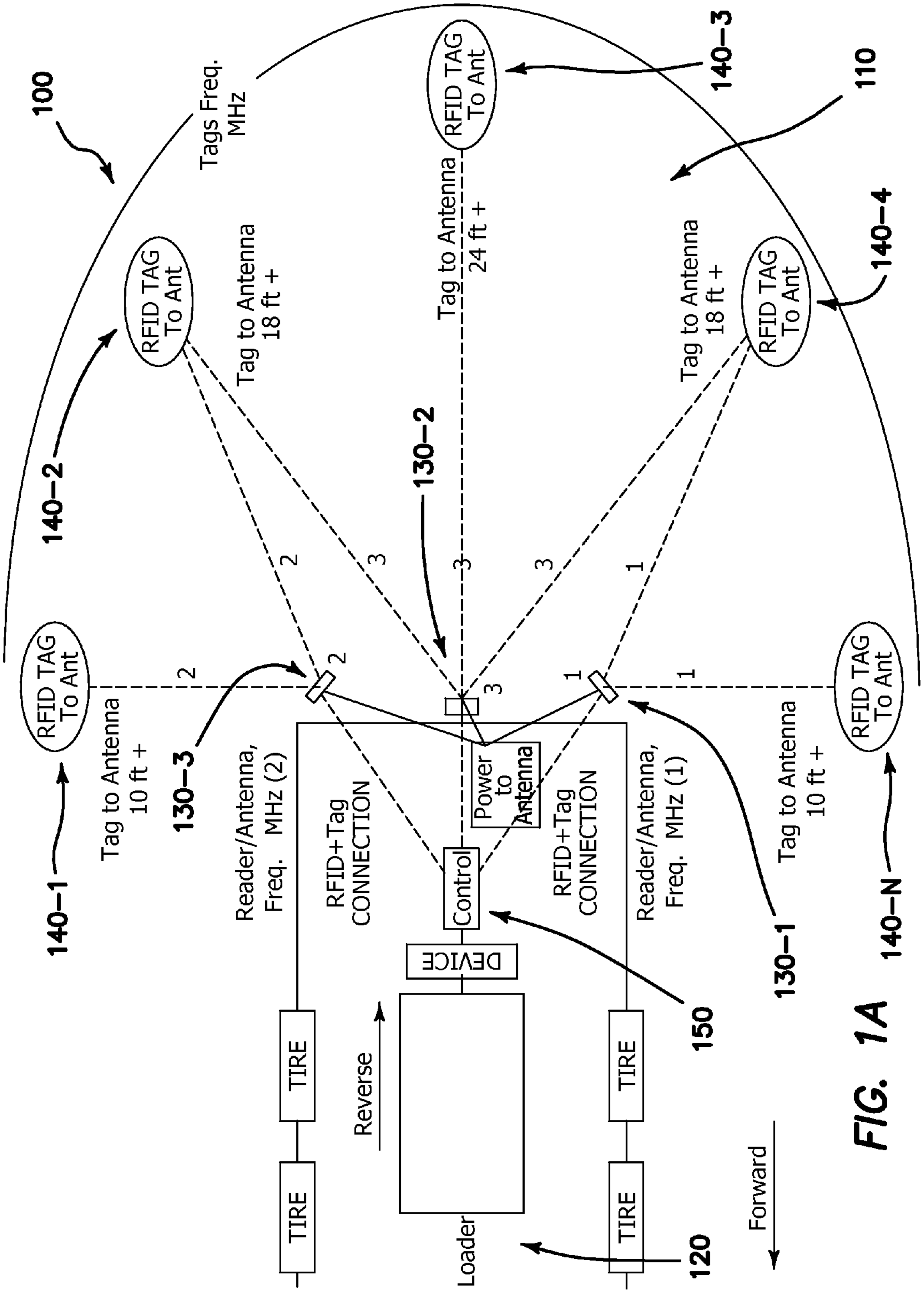
FIGS. 1a and 1b illustrate an overhead view of a construction zone and danger zone utilizing a system/method according to the embodiments of the present invention.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are directed to a system and method for protecting workers in construction zone by detecting the location of the workers in the construction zone and automatically, under certain conditions, controlling pieces of heavy equipment, such as loaders, bulldozers, excavators and the like, accordingly.

Figure 1B:
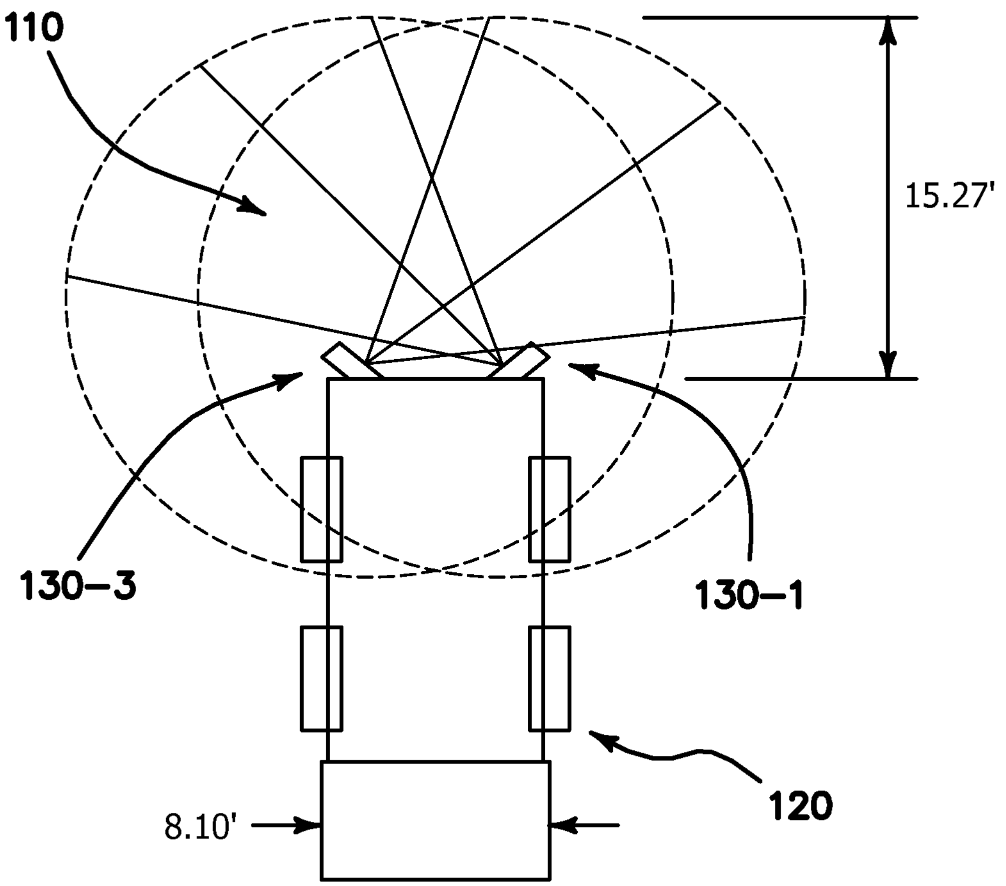
Figure 2:
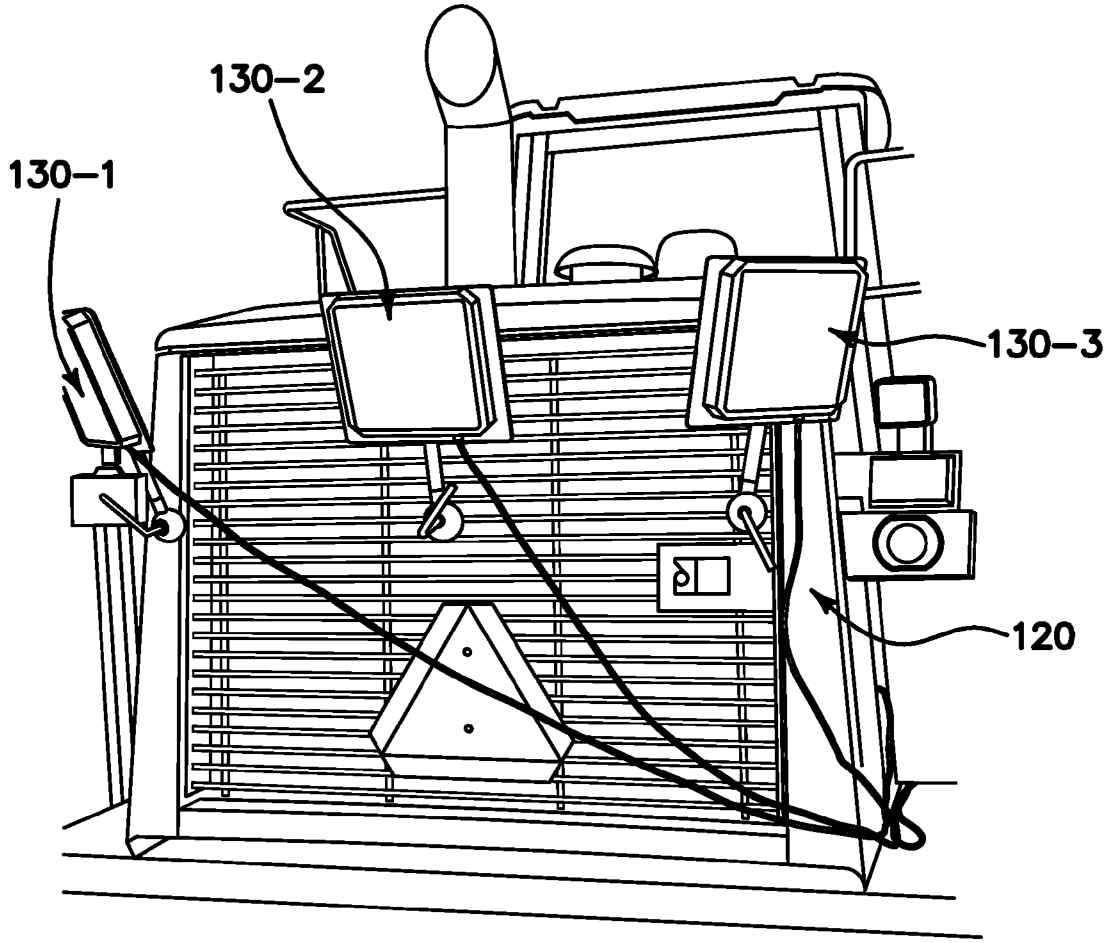
FIG. 2 illustrates a rear view of a heavy piece of equipment with readers attached according to the embodiments of the present invention.

FIGS. 1*a* and 1*b* show overhead views of a construction zone 100 utilizing a system/method according to the embodiments of the present invention. A danger zone 110 is identified generally behind a piece of heavy equipment 120. While the danger zone 110 is shown generally behind the piece of heavy equipment 120, those skilled in the art will recognize that the danger zone 110 may be on either side or in front of the piece of heavy equipment 120 as well. As shown in FIG. 2, one or more interrogators or readers (also known as two-way radio transmitter-receivers (transceivers)) 130-1 through 130-3 are attached to a rear portion of the piece of heavy equipment 120. The readers 130-1 through 130-3 are configured to transmit signals to one or more RFID tags 140-1 through 140-N and read a response from the RFID tags 140-1 through 140-N. The RFID tags 140-1 through 140-N are adhered to or contained within the clothing (e.g., vest) or equipment (e.g., hard hat) worn by construction workers in the construction zone. In one embodiment, as detailed below, the readers 130-1 through 130-3 transmit received signals to a controller 150 which is configured to control certain facets of the piece of heavy equipment 120 responsive thereto.

In one embodiment, the controller 150 is a processor on a circuit board driven by pre-programmed software or firmware linking the readers 130-1 through 130-3 with the controller 150 and hardware configured to automatically control the piece of the heavy equipment 120.

As shown in FIGS. 1*a* and 1*b*, the danger zone 110 takes on a semi-circular zone dictated by the range of the RFID tags 140-1 through 140-N and strength and position of the readers 130-1 through 130-3. In one embodiment, the danger zone 110 is defined by a space ten feet laterally in both directions from the rear of the piece of heavy equipment 120, eighteen feet diagonally from the rear of the piece of heavy equipment 120 and twenty-four feet directly rear of the piece of heavy equipment 120. Construction zones include many obstacles such that the objective is to create a workable environment whereby the piece of heavy equipment is not being needlessly stopped. Thus, different construction zones may require danger zones of different dimensions and sizes. The contractor or other entity may determine the appropriate size of the danger zone for a given job.

In one embodiment, responsive to the piece of heavy equipment 120 being in a reverse gear, the readers 130-1 through 130-3 are activated such that the readers 130-1 through 130-3 begin to transmit signals receivable by RFID tags 140-1 through 140-N which then transmit identification information (e.g., serial number associated with the RFID tag and worker identification information), to the readers 130-1 through 130-3. The received information from the RFID tags 140-1 through 140-N is, in one embodiment, transmitted to the controller 150 integrated into the piece of heavy equipment 120. The controller 150, using stored software, firmware and/or other pre-programmed code, evaluates the information signals received from the RFID tags 140-1 through 140-N to determine a location of the RFID tags 140-1 through 140-N relative to the piece of heavy equipment 120. Responsive to the controller 150 determining that one or more of the RFID tags 140-1 through 140-N are located in the danger zone 110, the controller 150 causes application of the parking brake of the piece of heavy equipment 120 and/or disengagement of the transmission of the piece of heavy equipment 120 into a neutral position thereby stopping the piece of heavy equipment 120 from continuing in motion. Application of the parking brake may automatically move the transmission of the heavy piece of equipment 120 into a neutral position.

Figure 3:
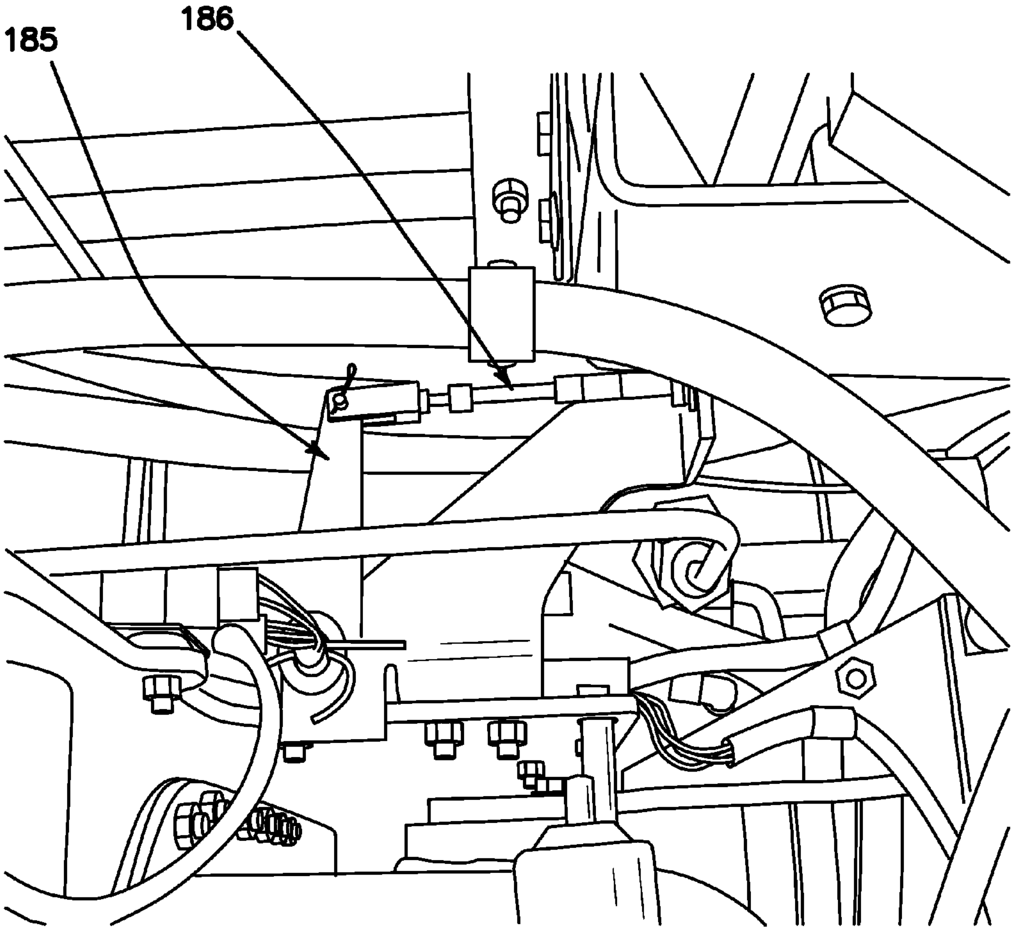
FIG. 3 illustrates a view of the parking brake lever and related mechanisms without the system detailed herein installed.
Figure 4A:
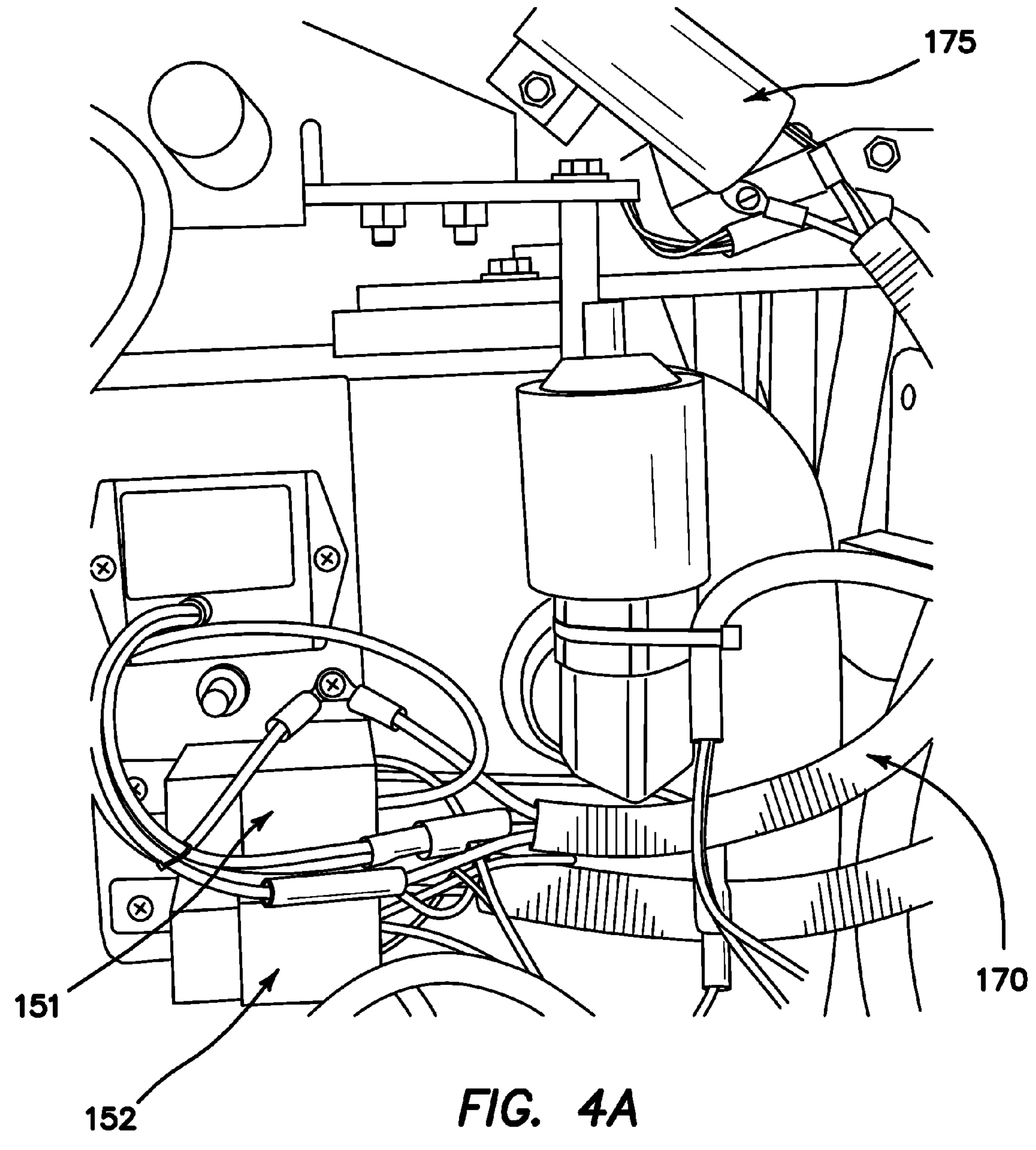
FIGS. 4a-4c illustrate views of a piece of heavy equipment with parking brake control mechanism installed according to the embodiments of the present invention.
Figure 4B:
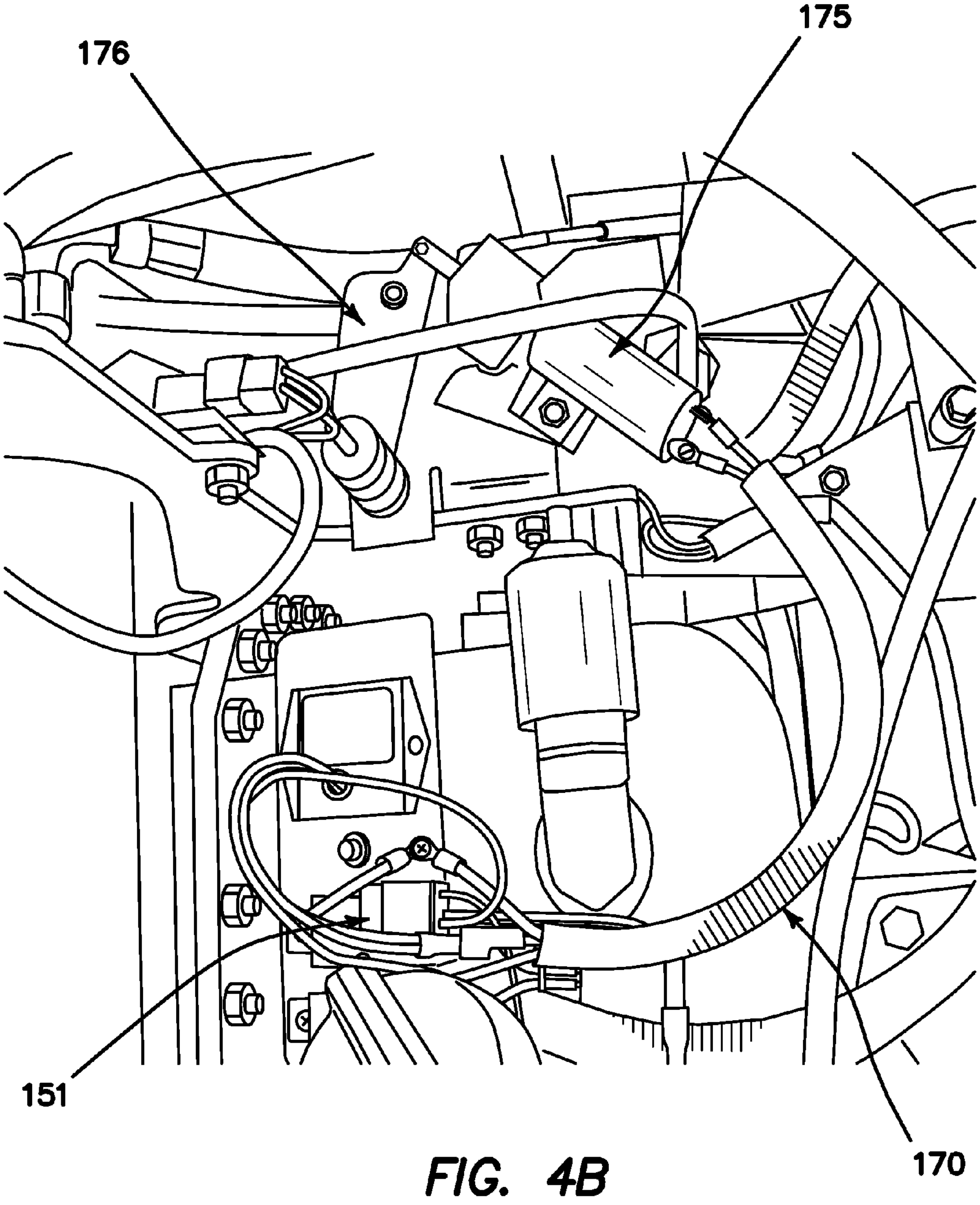
Figure 4C:
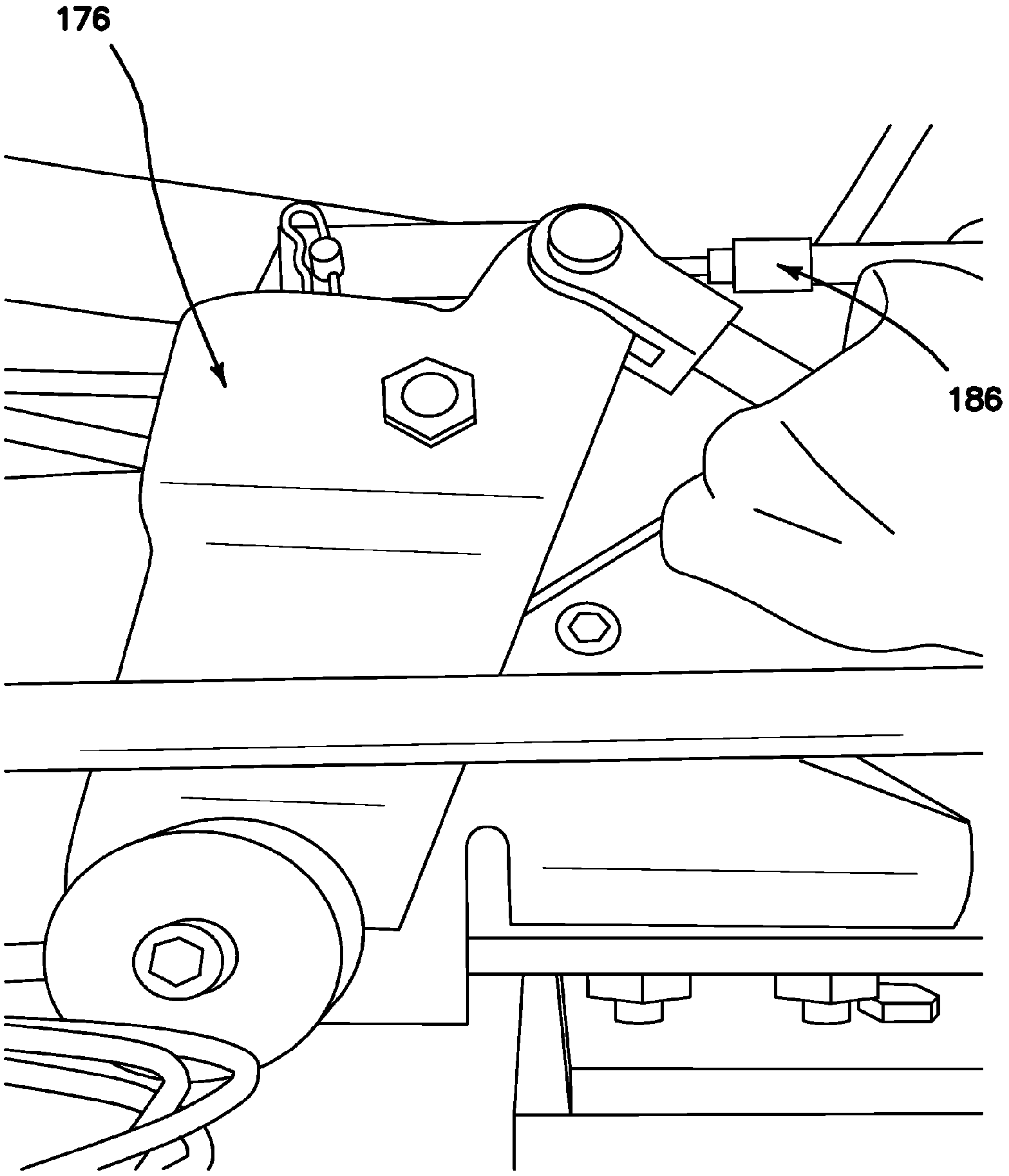
Figure 5:
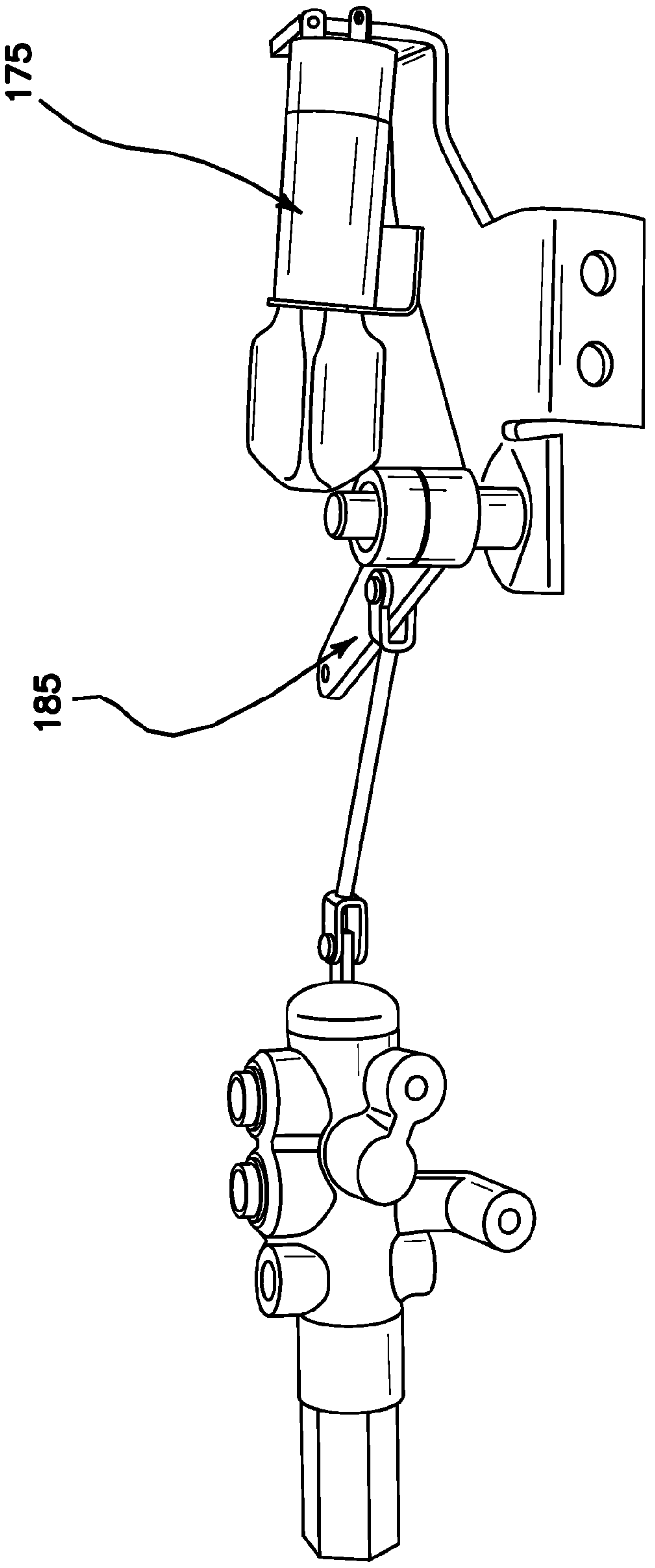
FIG. 5 illustrates a view of portions of the parking brake control mechanism uninstalled according to the embodiments of the present invention.

FIG. 3 shows standard parking brake lever 185 and linkage 186 which engages and disengages the parking brake via the parking brake lever 185. The linkage 186 is driven by a rod and button apparatus or other parking brake control apparatus in the cab of the heavy piece of equipment 120. Depression of the button causes the parking brake to be released while pulling of the button engages the parking brake. FIGS. 4*a*-4*c* show views of a parking brake mechanism installed on the heavy piece of equipment 120 to facilitate automatic application of the parking brake responsive to receipt of a signal corresponding to a construction in a danger zone. FIG. 5 shows views of the parking brake mechanism of the embodiments of the present invention uninstalled. The mechanism includes a controller 150 (shown in FIG. 6), a pair of relays 151, 152, a pull/hold coil 170, solenoid 175, and linkage 176 attached to parking brake lever 185. A first relay 151 of 24V arms the system responsive to the piece of heavy equipment 120 being in a reverse gear. Responsive to a signal corresponding to a worker in the danger zone being received, the second relay 152 of 12V triggers the solenoid 175 forcing the linkage 176 to apply the parking brake.

Figure 7:
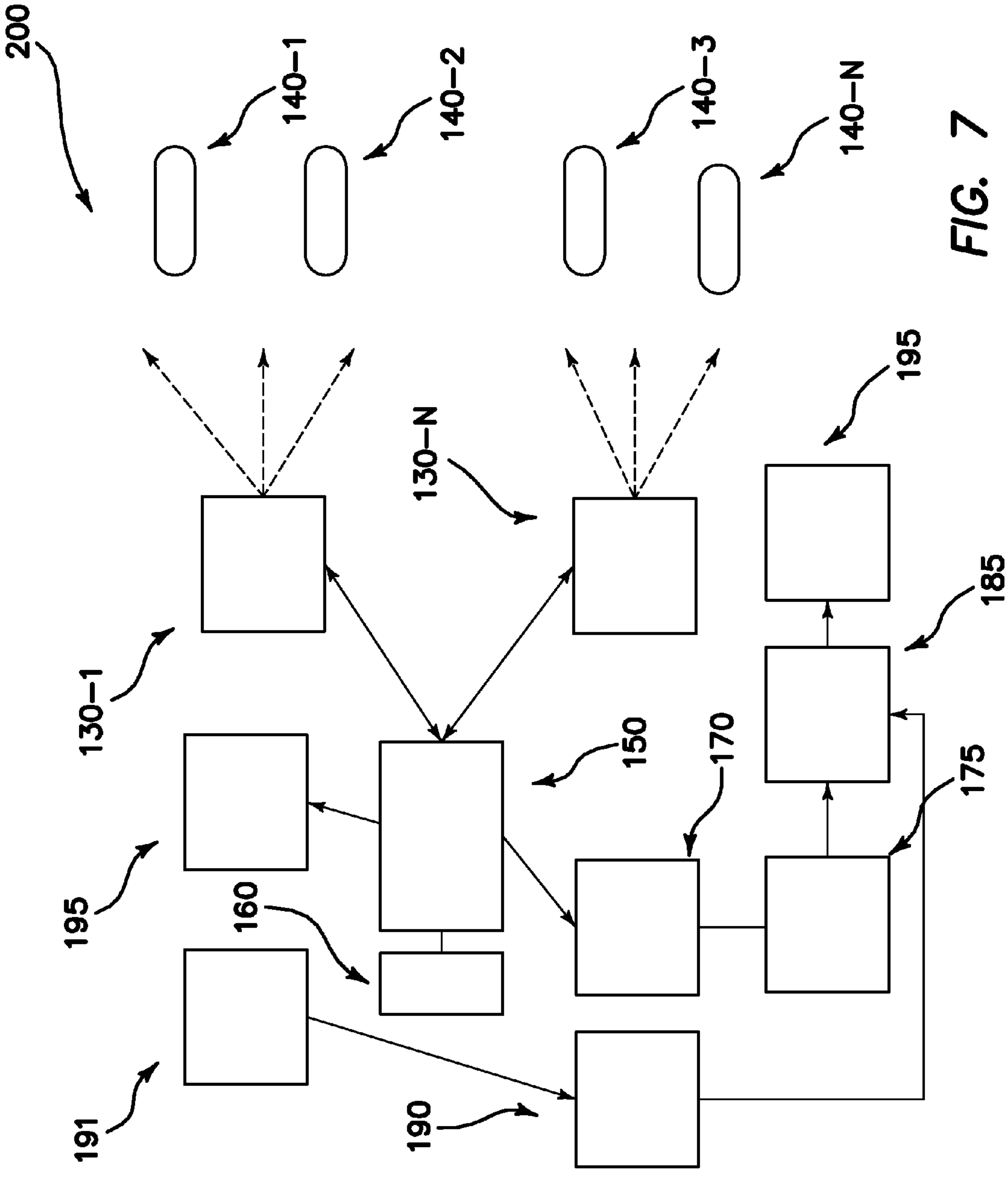
FIG. 7 illustrates a block diagram of a system according to the embodiments of the present invention.

FIG. 7 shows a block diagram 200 of a system according to the embodiments of the present invention. As detailed above, the system includes one or more readers 130-1 through 130-N, RFID tags 140-1 through 140-N, controller 150 and power source 160 for system components installed on piece of heavy equipment 120. In one embodiment, an AC inverter converts DC power from the piece of heavy equipment 120 to drive the readers 130-1 through 130-N and other electronic devices. The controller 150 communicates with a mechanical parking brake pull/hold coil 170 configured to physically apply the parking brake 195 of the piece of heavy equipment 120 which in turn automatically disengages the transmission and places the transmission into a neutral position. A solenoid 175, when activated by the controller 150, drives the pull/hold coil 170 which is attached to a parking brake lever 185 beneath the piece of heavy equipment 120 thereby moving the parking brake lever 185 causing the parking brake to be applied and the transmission to shift into the neutral position. Normally, a parking brake lever 185 requires 4-5 pounds of force to be applied and therefore the pull-hold coil 170 and solenoid 175 are configured to apply at least 5 pounds of force but ideally 7.5 to 10 pounds of force are applied. The parking brake pull/hold coil 170 may be installed to run parallel to the manual parking brake coil 190 which is installed at the factory during manufacture of the piece of heavy equipment 120 and is driven by manual actuation of the parking brake button 191 in the cab. A factory cab alarm 195 alerts the operator to the application of the parking brake lever 185. Obviously, application of the parking brake lever 185 is immediately known to the operator given the sudden stop of the piece of heavy equipment 120 but the factory cab alarm 195 provides the operator with the reason for the sudden stop (i.e., not a mechanical failure).

Figure 8:
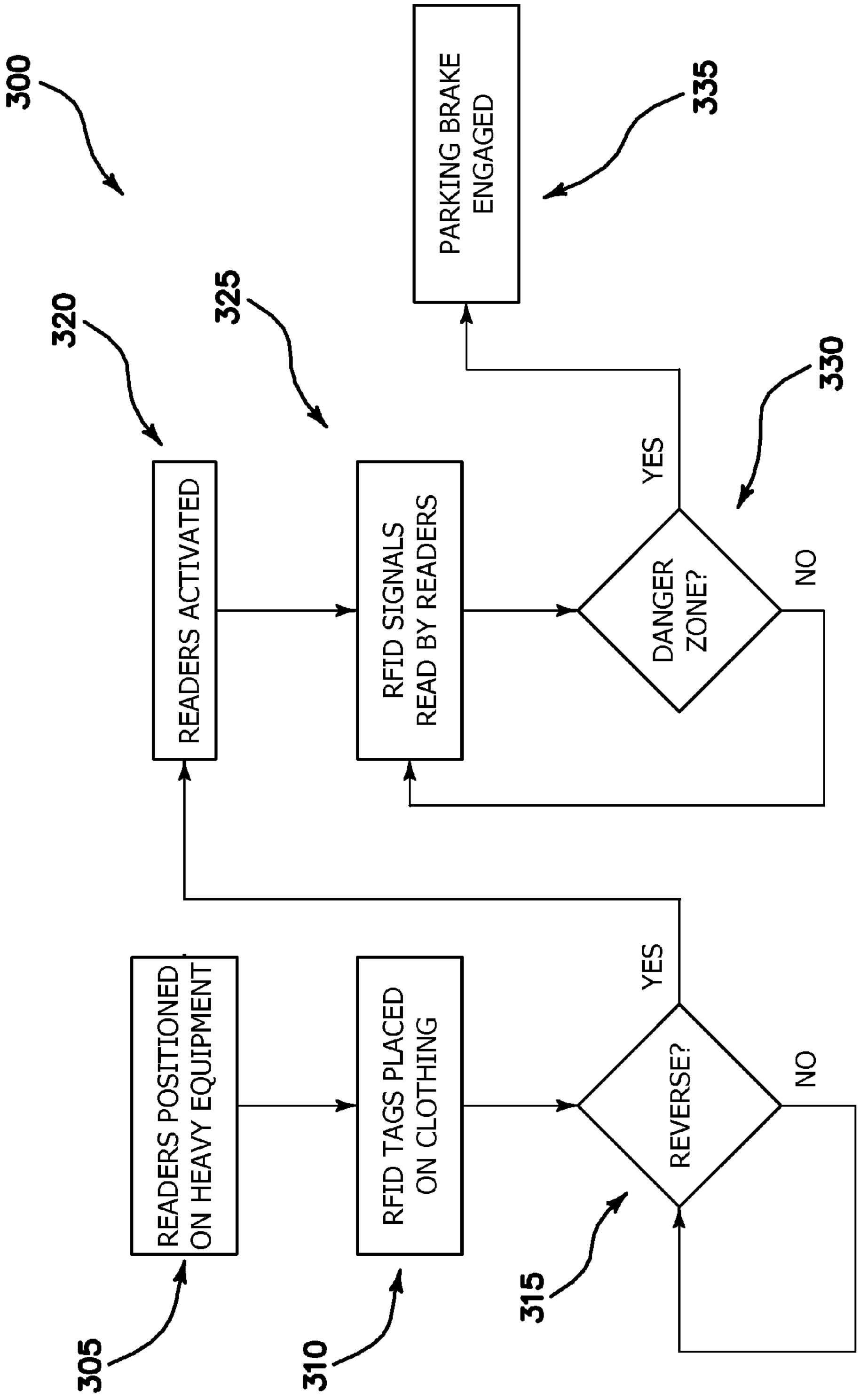
FIG. 8 illustrates a flow chart detailing a methodology of using the system according to the embodiments of the present invention.

Exemplary operation of the system is detailed in flow chart 300 of FIG. 8. At 305, readers are positioned on a piece of heavy equipment and configured to define a desired danger zone. At 310, RFID tags are placed on worker clothing and/or equipment and configured to transmit desired information carrying signals. At 315, it is determined if the transmission of the piece of heavy equipment is in a reverse gear. If not, the flow chart 300 loops back to 315. If so, at 320, the readers are activated. At 325, signals transmitted by said RFID tags are read by readers on a piece of heavy equipment. At 330, signals received by said readers are transmitted to a controller. At 335, the controller determines if the RFID tags are in the defined danger zone. If not, the flow chart 300 loops back to 325. If so, at 330, the controller triggers a solenoid to drive a pull/hold coil causing a parking brake lever to be engaged and parking brake to be applied and transmission shifted into neutral. At 335, an operator of the piece of heavy equipment must manually disengage the parking brake from the cab once the danger zone is clear.

Figure 9:
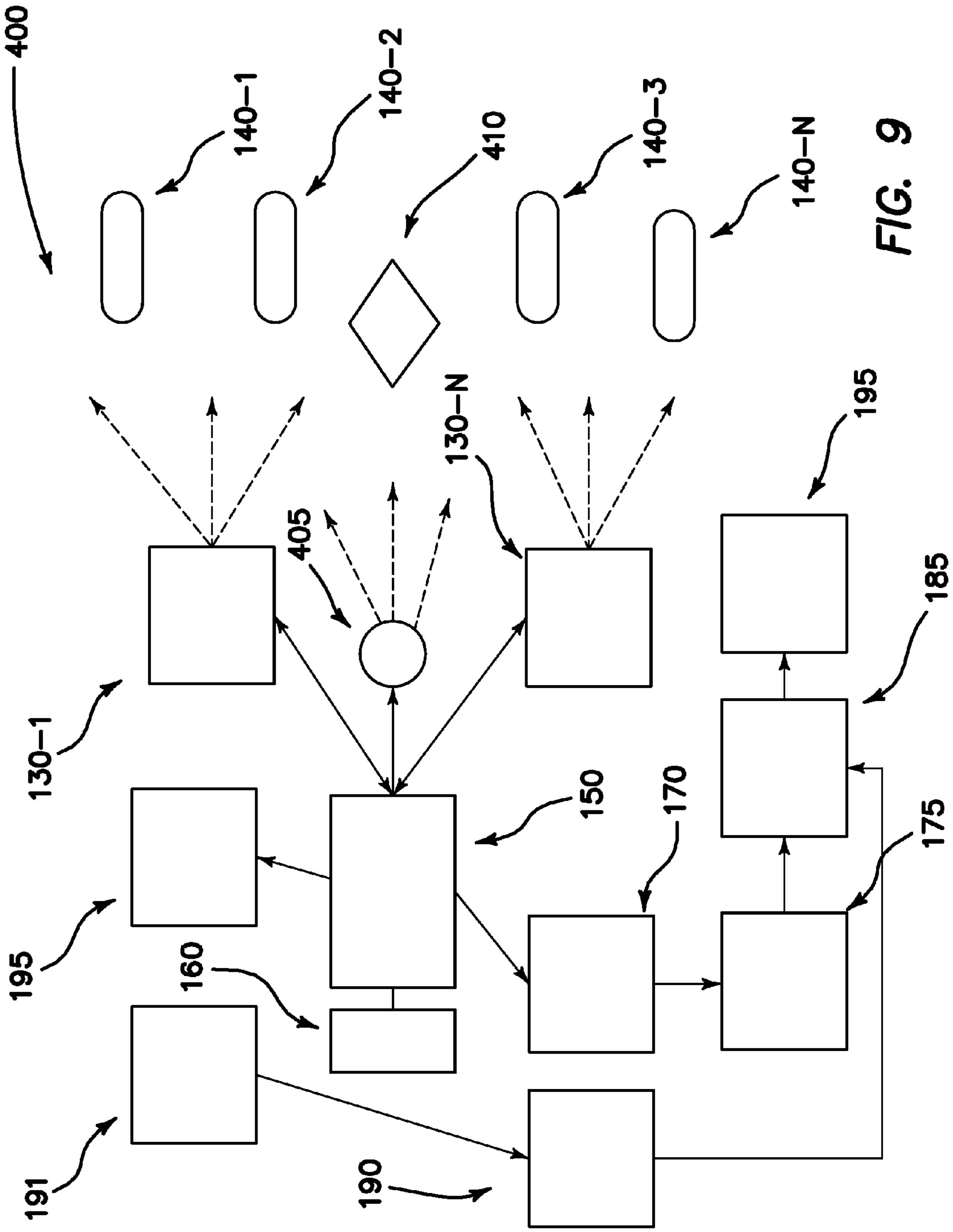
FIG. 9 illustrates a block diagram of a system according to the embodiments of the present invention.

In one embodiment, as shown in block diagram 400 of FIG. 9, the system includes the components of block diagram 200 plus a transmitter 405 configured to send a signal to the pager, smart phone, personal digital assistant or other mobile device 410 of a construction site manager or other supervisory personnel. The signal may also be transmitted to a personal computer. The signal alerts the manager that the heavy piece of equipment 120 was forcibly stopped to prevent injury to one or more construction workers. This allows the manager to investigate and memorialize the incident.

Figure 6:
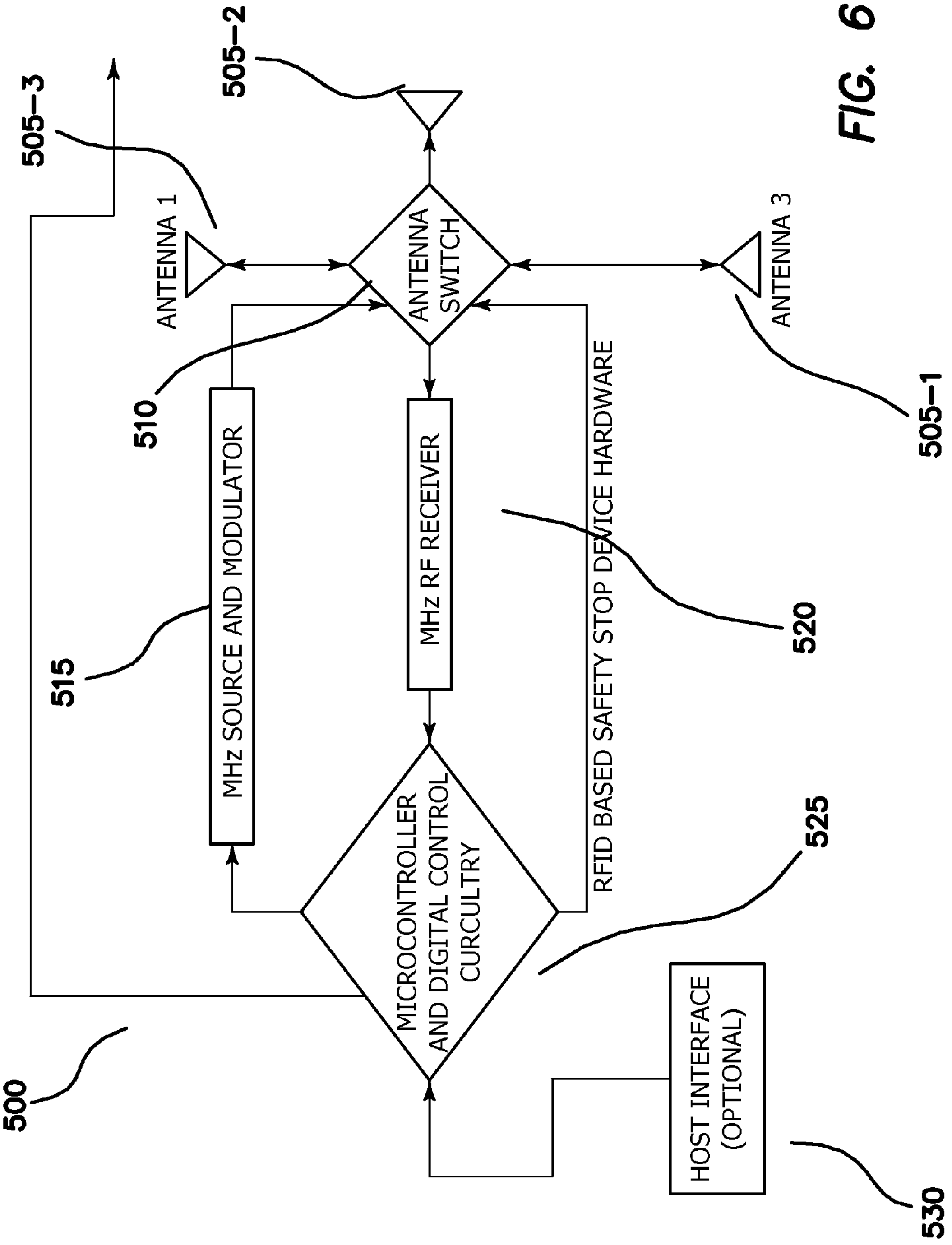
FIG. 6 illustrates a block diagram of certain electrical components of the system according to the embodiments of the present invention.

FIG. 6 illustrates a block diagram 500 of exemplary electrical components of the system according to the embodiments of the present invention. As shown, a series of readers/antennas 505-1 through 505-3 communicate with switch 510 and uses a transmitter 515 to transmit a 928 MHz signal (or any other RF signal frequency) to the RFID tags and a receiver 520 to receive feedback signals from the RFID tags. A controller 525 communicates with the readers/antennas 505-1 through 505-3 and an optional user interface 530. The controller 525 also communicates with (i.e., triggers) the parking brake mechanism.

Figure 10A:
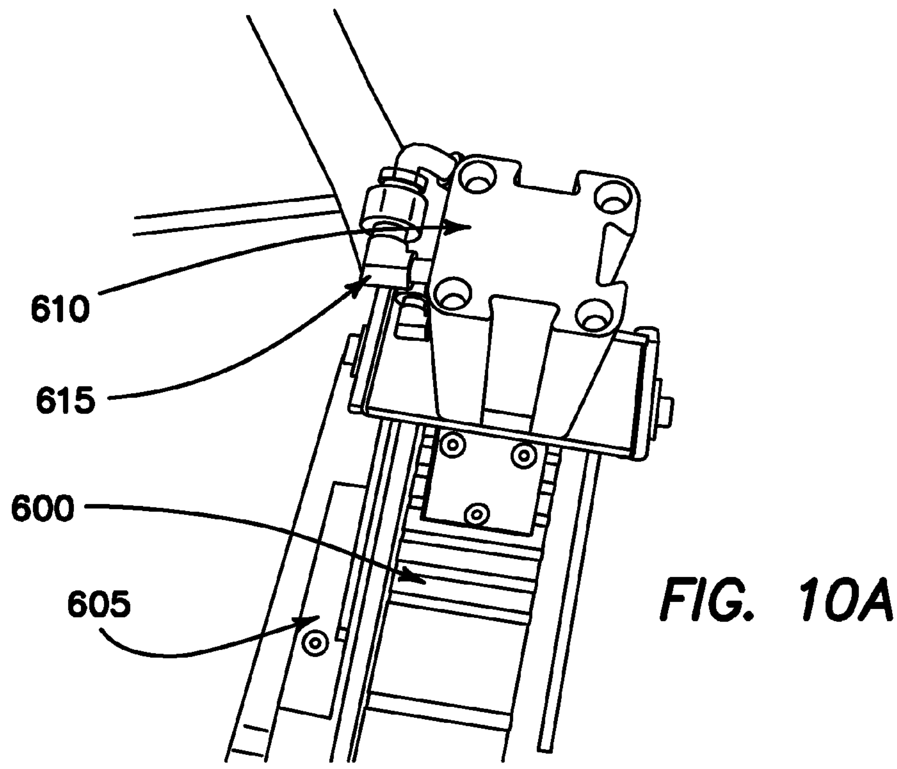
Figure 10B:
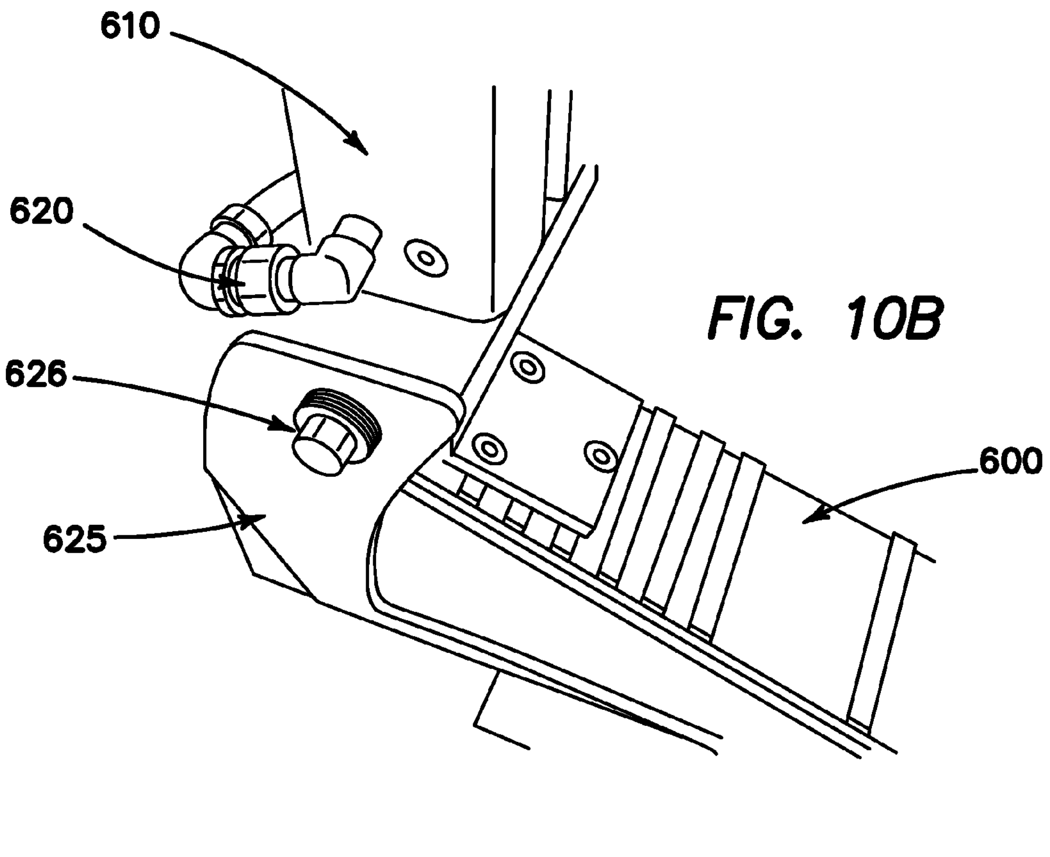
Figure 10D:
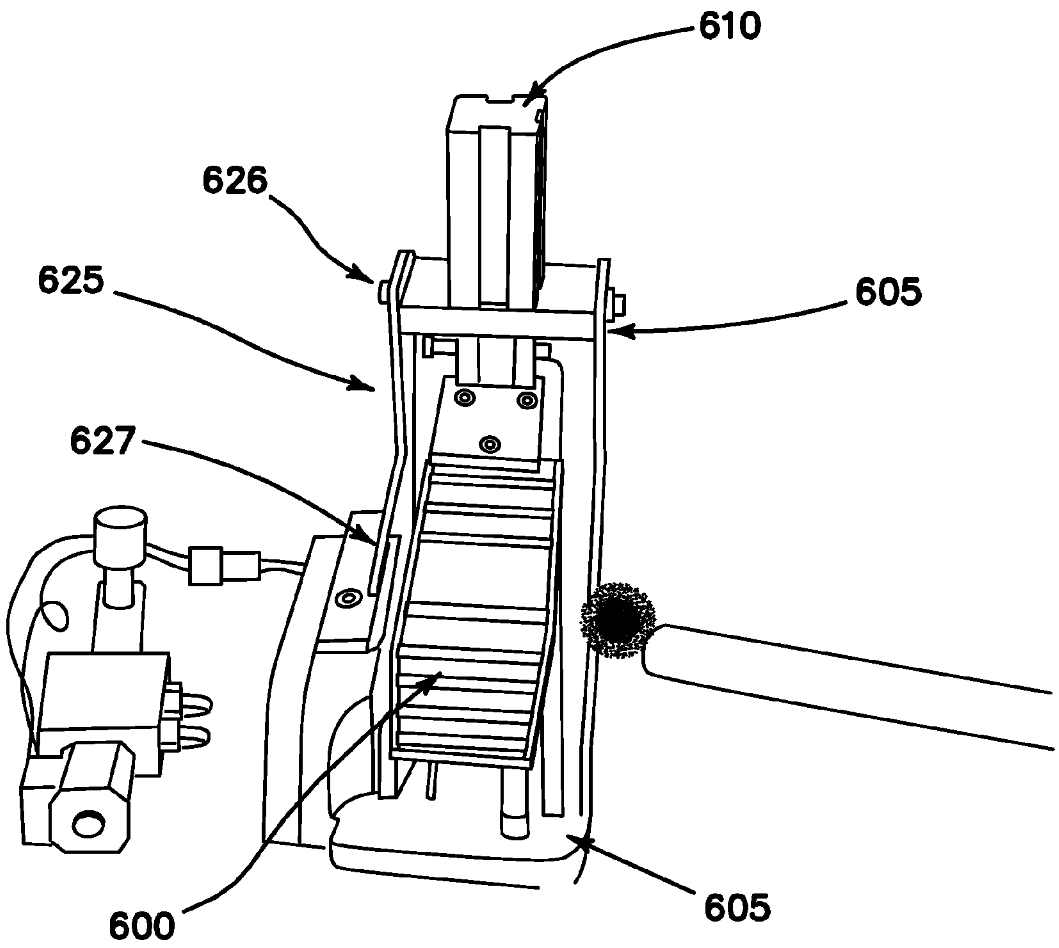

FIGS. 10*a*-10*e* illustrate an automatically controlled de-clutch brake pedal adapted to control a wet brake system according to the embodiments of the present invention. The de-clutch brake pedal 600 is secured by a de-clutch pedal bracket 605 attached to the heavy piece of equipment and is controlled (i.e., depressed and released) automatically by a hydraulic cylinder 610 in physical contact with the brake pedal 600. FIG. 10*d* shows the de-clutch brake pedal 600, bracket 605 and hydraulic cylinder 610 when not installed while FIG. 10*e* shows the de-clutch brake pedal 600 when not installed. The hydraulic cylinder 610 receives hydraulic fluid via an input tube 615 and discharges hydraulic fluid via an output tube 620.

In one embodiment, the physical contact between the hydraulic cylinder 610 and de-clutch brake pedal 600 involves a rotatable arm assembly 625 attached at a first end 626 to the hydraulic cylinder 610 and attached at a second end 627 to the de-clutch pedal bracket 605.

As set forth above, responsive to the piece of heavy equipment 120 being in a reverse gear, the readers 130-1 through 130-3 are activated such that the readers 130-1 through 130-3 begin to transmit signals receivable by RFID tags 140-1 through 140-N which then transmit identification information (e.g., serial number associated with the RFID tag and worker identification information), to the readers 130-1 through 130-3. The received information from the RFID tags 140-1 through 140-N is, in one embodiment, transmitted to the controller 150 integrated into the piece of heavy equipment 120. The controller 150, using stored software, firmware and/or other pre-programmed code, evaluates the information signals received from the RFID tags 140-1 through 140-N to determine a location of the RFID tags 140-1 through 140-N relative to the piece of heavy equipment 120. Responsive to the controller 150 determining that one or more of the RFID tags 140-1 through 140-N are located in the danger zone 110, the controller 150 causes the de-clutch brake pedal 600 to depress by directing hydraulic fluid to the hydraulic cylinder 610 which forces application of the de-clutch brake pedal 600 causing the automatic application of the hydraulic disc or wet brakes of the heavy piece of equipment 120. In one embodiment, the hydraulic fluid directed to the de-clutch brake pedal 600 is transferred to the hydraulic cylinder 610 by means of hydraulic control 630 integrated into the stock or factory hydraulic system of the heavy piece of equipment 120. Those skilled in the art will understand that a separate hydraulic system (in addition to the factory hydraulic system) may be installed to control the automatic de-clutch pedal 600. In one embodiment, the application of the de-clutch pedal 600 also disengages the transmission of the piece of heavy equipment 120 into a neutral position.

Figure 11A:
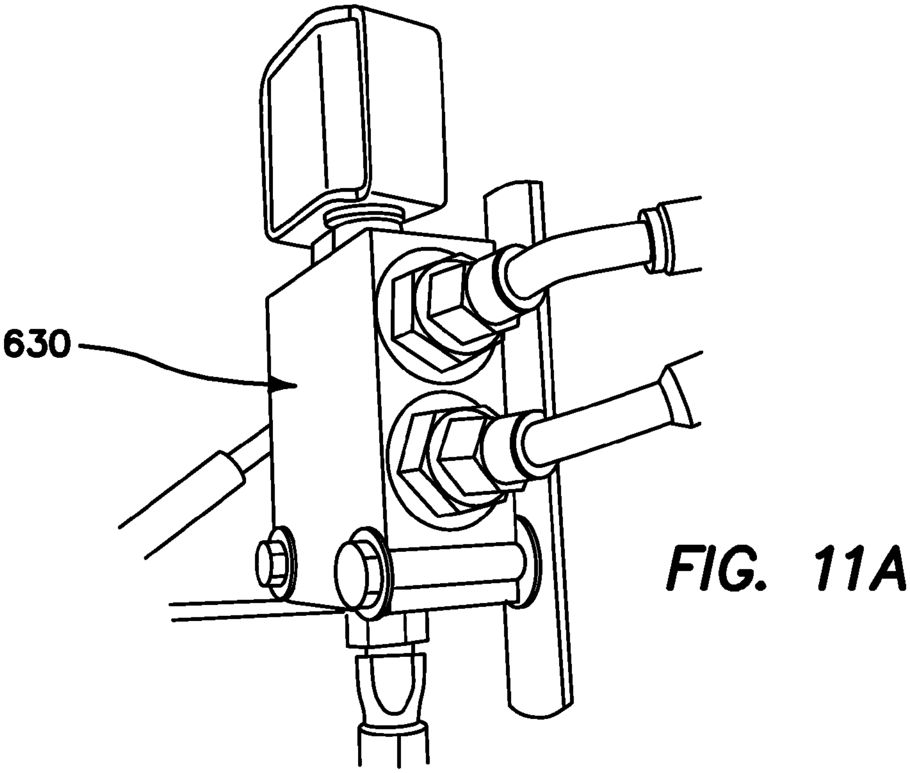
FIGS. 11a-11b illustrate a hydraulic control which forms part of the automatic wet brake system according to the embodiments of the present invention.
Figure 11B:
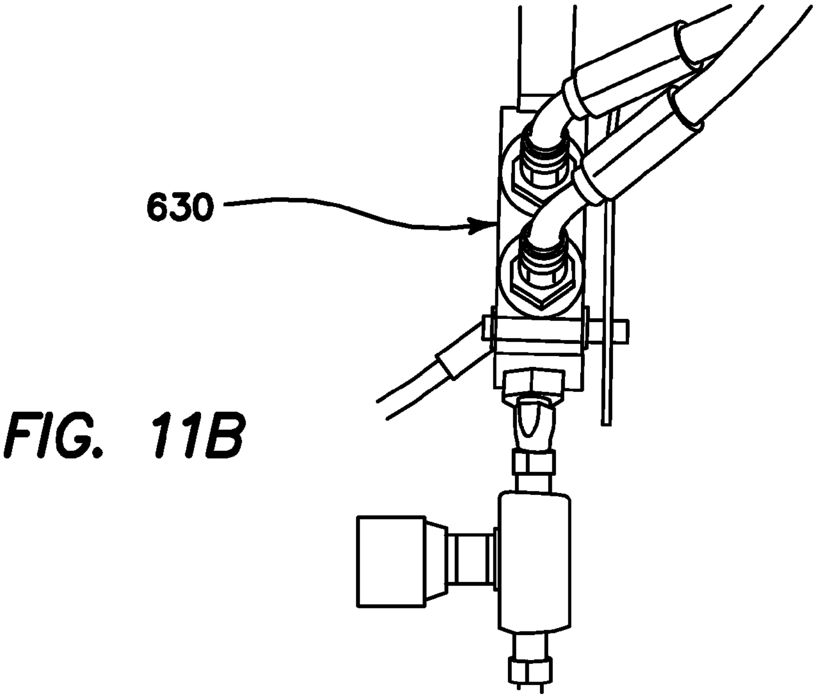

FIGS. 11*a*-11*b* illustrate the hydraulic control 630 which: (i) transfers hydraulic fluid to the hydraulic cylinder 610 responsive to the de-clutch brake pedal 600 being depressed; and (ii) transfers hydraulic fluid to the disc brakes responsive to the de-clutch brake pedal 600 being depressed.

Figure 12:
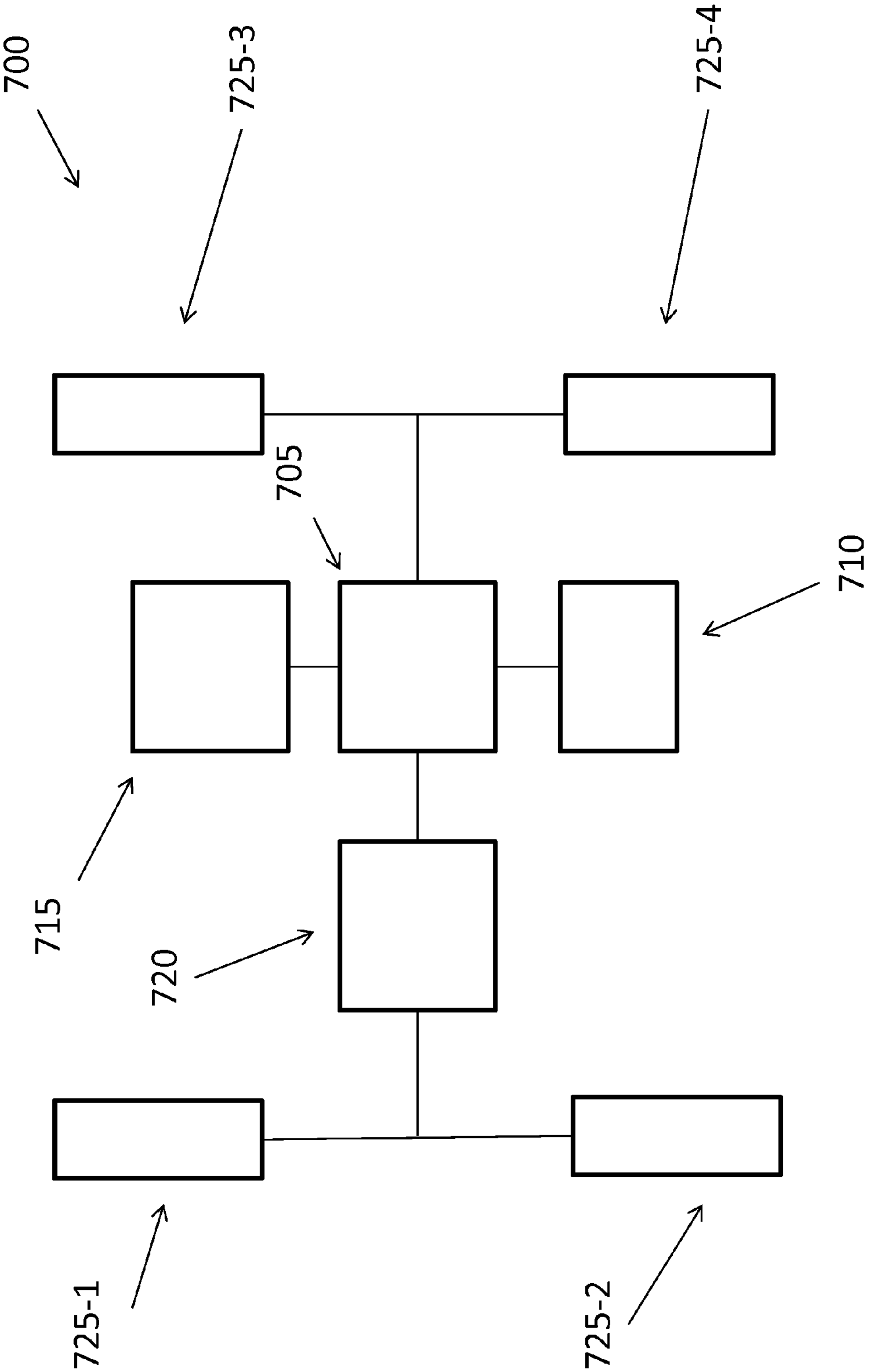
FIG. 12 illustrates a block diagram of an automatic brake system according to the embodiments of the present invention.

FIG. 12 illustrates a block diagram of an automatic brake system 700 according to one embodiment of the present invention. The system 700 comprises the de-clutch brake pedal 705, de-clutch brake pedal bracket 710, hydraulic cylinder 715, hydraulic controller 720 and disc brakes 725-1 through 725-4. This automatic wet brake system may operate independently or in combination with the parking brake system described above.

Figure 13:
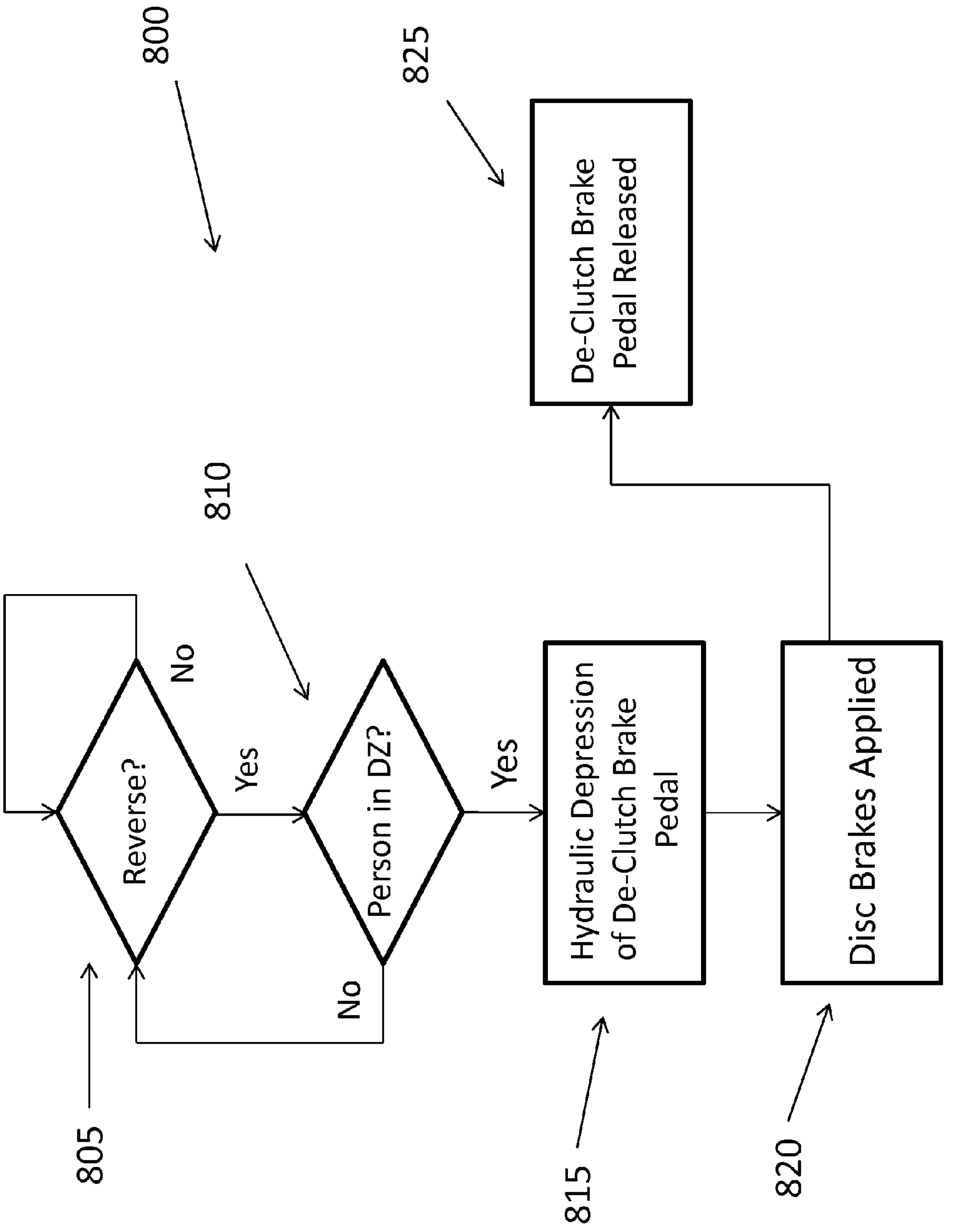
FIG. 13 illustrates a flow chart detailing one methodology associated with the automatic brake system according to the embodiments of the present invention.

FIG. 13 shows a flow chart 800 detailing one methodology associated with the automatic brake system 700. At 805, it is determined by the readers if the heavy equipment is in reverse gear. If not, the chart 800 loops back to 805. If so, at 810, it is determined by the readers if a person is in the danger zone. If not, the chart 800 loops back to 805. If, at 815, it is determined that a person is in the danger zone, at 820, the hydraulic control causes the hydraulic cylinder to be depressed thereby depressing the de-clutch brake pedal. At 825, responsive to the de-clutch brake pedal being depressed, hydraulic fluid is moved to the disc brakes of the heavy piece of equipment causing the disc brakes to be applied thereby stopping the heavy piece of equipment. At 830, responsive to the person being outside of the danger zone, the hydraulic control releases the hydraulic cylinder and de-clutch brake pedal by removing some or all of the hydraulic fluid acting on the hydraulic cylinder. In another embodiment, the driver of the heavy piece of equipment may manually release the hydraulic cylinder and de-clutch brake pedal.

Figure 14A:
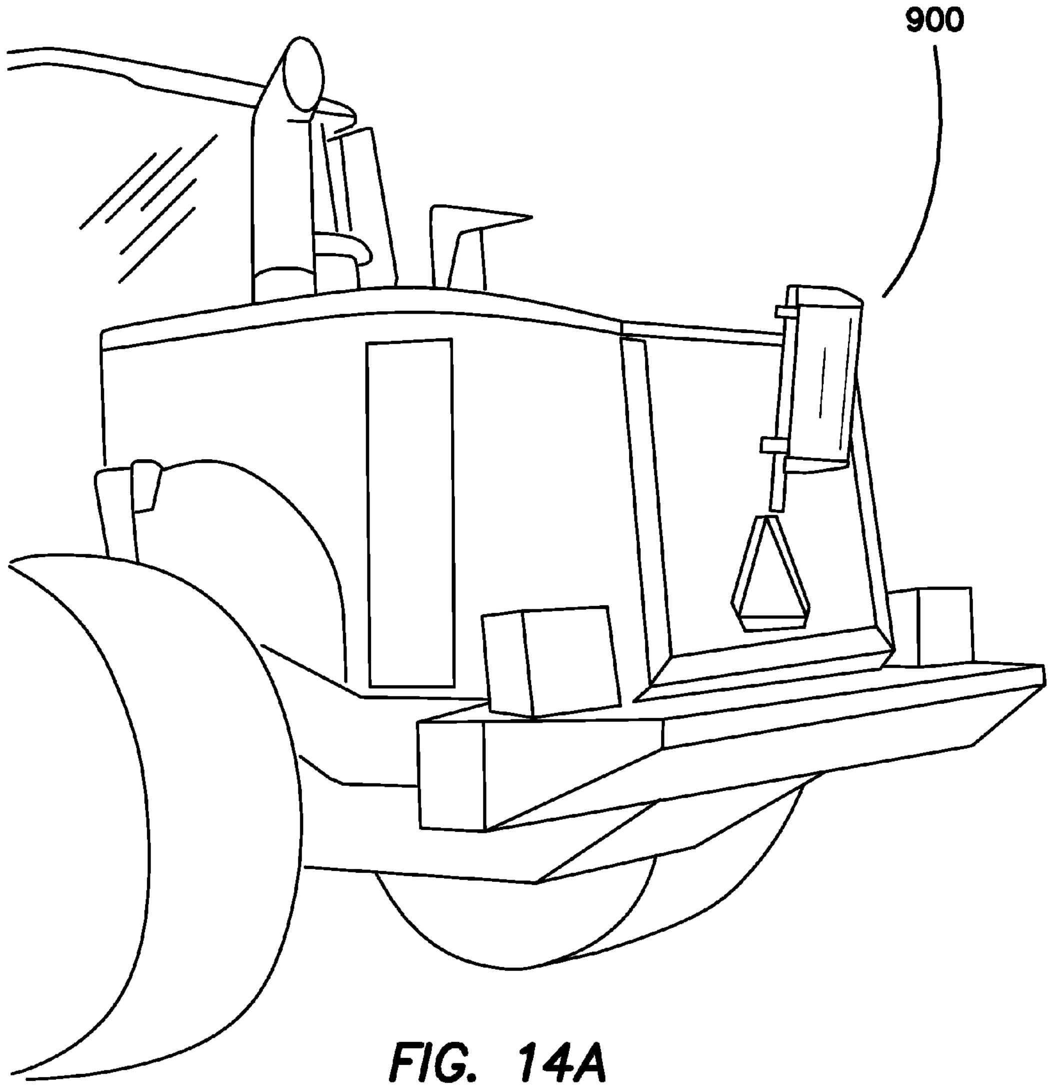
FIG. 14a illustrates a side view of a heavy piece of equipment with a single antenna in place according to the embodiments of the present invention.
Figure 14B:
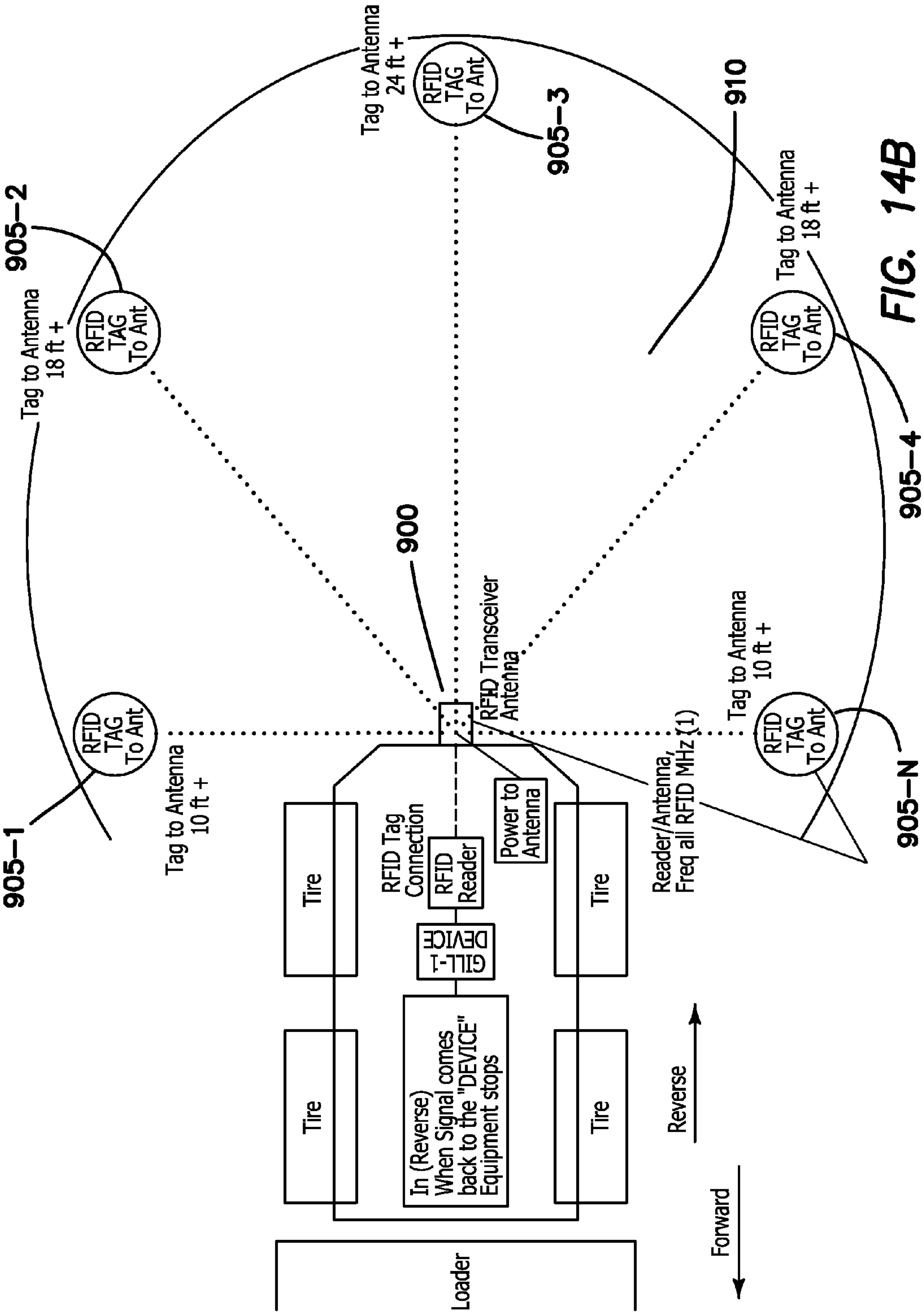
FIG. 14b illustrates an overhead view of a construction zone and danger zone utilizing a system/method according to a single antenna embodiment of the present invention.

While previously detailed embodiments show multiple readers/antennas, FIGS. 14*a* and 14*b* show a single centrally-positioned antenna 900 configured to read RFID tags 905-1 through 905-N in a defined danger zone 910. Responsive to the antenna 900 receiving a signal from one of the RFID tags 905-1 through 905-N readers the hydraulic control causes the hydraulic cylinder to be depressed thereby depressing the de-clutch brake pedal.

Although the invention has been described in detail with reference to several embodiments, additional variations and modifications exist within the scope and spirit of the invention as described and defined in the following claims.

We claim:

1. A safety system comprising:

one of more signal transmitters affixed to clothing or equipment of workers;

one or more transceivers affixed to a piece of heavy equipment, said transceivers positioned and configured to define a danger zone, said transceivers further configured to receive signals from said one or more signal transmitters affixed to clothing or equipment of workers, said transceivers configured to be activated responsive to a transmission of said piece of heavy equipment being in a reverse gear;

a controller in communication with said one or more transceivers;

a hydraulic cylinder positioned proximate with a de-clutch brake pedal;

a de-clutch brake pedal bracket connecting said hydraulic cylinder to said heavy piece of equipment about said de-clutch brake pedal such that said hydraulic cylinder is above said de-clutch brake pedal;

wherein said hydraulic cylinder is automatically activated responsive to said controller determining, based on outputs of said one or more transceivers, that one or more signal transmitters are in said danger zone causing said hydraulic cylinder to lower into contact with an upper surface of said de-clutch brake pedal thus depressing said de-clutch brake pedal thereby engaging a wet brake system associated with the heavy piece of equipment; and a message transmitter configured to send a message to designated personnel informing said designated personnel of automatic engagement of said wet brake system due to one or more signal transmitters being in said danger zone.

2. The safety system of claim 1 wherein said controller includes at least a processor.

3. The safety system of claim 1 wherein said de-clutch brake pedal is further configured to disengage a transmission associated with the heavy piece of equipment.

4. A safety system comprising:

one of more RFID tags affixed to clothing or equipment of workers;

one or more readers affixed to a piece of heavy equipment, said readers positioned and configured to define a danger zone rear of the piece of heavy equipment, said readers further configured to receive signals from said one or more RFID tags affixed to clothing or equipment of workers, said readers configured to be activated responsive to a transmission of said piece of heavy equipment being in a reverse gear;

a hydraulic cylinder positioned proximate with a de-clutch brake pedal;

a de-clutch brake pedal bracket connecting said hydraulic cylinder to said heavy piece of equipment about said de-clutch brake pedal such that said hydraulic cylinder is above said de-clutch brake pedal;

wherein said hydraulic cylinder is automatically activated responsive to said controller determining, based on outputs of said one or more transceivers, that one or more signal transmitters are in said danger zone causing said hydraulic cylinder to lower into contact with an upper surface of said de-clutch brake pedal thus depressing said de-clutch brake pedal thereby engaging a wet brake system associated with the heavy piece of equipment; and a message transmitter configured to send a message to designated personnel informing said designated personnel of automatic engagement of said wet brake system due to one or more signal transmitters being in said danger zone.

5. The safety system of claim 4 wherein said controller includes at least a processor.

6. The safety system of claim 4 wherein said de-clutch brake pedal is further configured to disengage a transmission associated with the heavy piece of equipment.

7. A method of providing safety in a subject area comprising:

affixing one of more signal transmitters to clothing or equipment of workers;

affixing one or more transceivers to a piece of heavy equipment in a manner to define a danger zone, said transceivers further configured to receive signals from said one or more signal transmitters affixed to clothing or equipment of workers;

activating said transceivers responsive to a transmission of said piece of heavy equipment being in a reverse gear;

detecting, via said one or more transceivers, one or more signal transmitters in a defined danger zone relative to said piece of heavy equipment;

responsive to the detecting of said one or more signal transmitters in said defined danger zone, automatically activating, via a controller, a bracketed hydraulic cylinder proximate a de-clutch brake pedal causing said hydraulic cylinder to lower down into contact with an upper surface of said de-clutch brake pedal thus depressing said de-clutch brake pedal thereby engaging a wet brake system associated with the heavy piece of equipment; and sending via a message transmitter, a message to designated personnel informing said designated personnel of automatic engagement of said wet brake system due to one or more signal transmitters being in said danger zone.

8. The method of claim 7 further comprising responsive to detecting, via said one or more transceivers, one or more signal transmitters in said defined danger zone disengaging a transmission associated with the heavy piece of equipment.

* * * * *